(12) United States Patent
Saka et al.

(10) Patent No.: US 6,376,928 B1
(45) Date of Patent: Apr. 23, 2002

(54) ELECTRIC CURRENT DISTRIBUTION SYSTEM FOR AUTOMOTIVE VEHICLES

(75) Inventors: Yuuji Saka; Takahiro Onizuka, both of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 1124 days.

(21) Appl. No.: 08/520,606

(22) Filed: Aug. 30, 1995

(30) Foreign Application Priority Data

Sep. 1, 1994 (JP) .............................................. 6-208921

(51) Int. Cl.$^7$ .............................................. B60R 16/02
(52) U.S. Cl. .................................................... 307/10.1
(58) Field of Search ................................ 307/9.1–10.8, 307/116–122, 132 EA; 180/271, 274, 279, 281, 282, 283; 123/198 B, 198 DB, 198 DC; 280/727, 728.1, 734, 735; 364/424.01–424.05; 361/104, 18, 54, 56; 340/436, 649, 669

(56) References Cited

U.S. PATENT DOCUMENTS

| | | | | |
|---|---|---|---|---|
| 2,304,608 A | * | 12/1942 | Smythe | 307/10.7 |
| 3,648,146 A | * | 3/1972 | Rollen et al. | 307/10.1 |
| 3,743,849 A | * | 7/1973 | Iwata | 180/279 |
| 3,781,824 A | * | 12/1973 | Caiati et al. | 364/925 |
| 4,721,872 A | * | 1/1988 | Simmons | 307/10.1 |
| 5,353,190 A | * | 10/1994 | Nakayama | 307/10.1 |
| 5,510,658 A | * | 4/1996 | Nakayama | 307/10.1 |
| 5,818,122 A | * | 10/1998 | Miyazawa et al. | 307/10.7 |
| 6,020,656 A | * | 2/2000 | Fildan | 307/10.7 |

FOREIGN PATENT DOCUMENTS

| | | | | |
|---|---|---|---|---|
| DE | 4305819 A1 | * | 9/1993 | G01P/15/00 |
| JP | 58-164457 | | 9/1983 | |

* cited by examiner

*Primary Examiner*—Fritz Fleming
(74) *Attorney, Agent, or Firm*—Anthony J. Casella; Gerald E. Hespos

(57) ABSTRACT

An electric current distribution system, particularly for automotive vehicles, comprises a junction box (5) having an input terminal connected with a battery (3) and a plurality of output terminals connected with loads (7), a fusible link (4) being connected between the input terminal of the junction box (5) and the battery (3), and earthing means (10; 12) acting in response to a crash sensor to earth the input terminal of the junction box (5). In the event of a car crash, the earthing means acts in response to the output from the crash sensor, thereby causing an electric current supplied from a battery 3 to flow to the earth via a fusible link 4. The electric current heats and fuses off the fusible link 4. Thus, the flow of electric current to the respective loads can securely be cut off by the construction simpler than that of the prior art.

19 Claims, 3 Drawing Sheets

ELECTRIC CURRENT DISTRIBUTION SYSTEM FOR AUTOMOTIVE VEHICLES

BACKGROUND OF THE INVENTION

1. Field of the Invention

The present invention relates to an electric current distribution system for automotive vehicles which distributes an electric current from an alternator or a battery to the respective loads by way of fuses and relays of series circuits in a junction box.

2. Description of the Prior Art

The prior art electric current distribution systems for automotive vehicles are, for example, constructed as shown in FIG. 3. Specifically, one end of a fusible link 4 is connected with a positive terminal of a battery 3 whose negative terminal is grounded and one end of another fusible link 2 is connected with an alternator (ALT) 1. The other ends of the fusible links 2 and 4 are both connected with an input terminal of a junction box 5 installed in an engine compartment. Ends of loads 7 such as lamps, motors and ignition systems are connected with a plurality of output terminals of the junction box 5 directly or by way of a switch 6, and the other ends thereof are grounded.

The junction box 5 accommodates a plurality of series circuits between its input and output terminals. The series circuits consist essentially of fuses FS and relays RL. For example, when the switch 6 is turned on, the respective relay RL acts to supply an electric current to the respective load 7.

During the starting of an engine after an ignition switch is turned on, an electric current from the battery 3 is supplied to the junction box 5. After the starting of the engine, an electric current obtained by rectifying an alternating current generated in the alternator 1 is supplied to the battery 3, to the junction box 5, and consequently to the respective loads 7.

Since the alternator 1 stops generating power in the event of a car crash, no electric current is supplied to the junction box 5 from the alternator 1, but an electric current from the battery 3 is still supplied to the junction box 5. Thus, even if the car crash results in a burnout or short circuit, the circuits cannot immediately be disconnected in the above construction. As a result, a variety of problems may arise due to an overcurrent.

In order to enable an emergency stop of power supply from a battery to electric parts (loads) in the event of the car crash, the construction as disclosed in Japanese Unexamined Patent Publication No. 58-164457 was proposed. An emergency cutoff mechanism including a relay, a relay drive transistor for opening and closing the relay and a control circuit for controlling the relay drive transistor is provided between each load and the battery of the automotive vehicle. There is also provided an impact detection mechanism for, upon detecting a deceleration of a specified level or higher, sending to the control circuit a signal used to control the relay drive transistor so as to cut off the power supply.

However, the construction disclosed in the above publication is complicated because the emergency cutoff mechanism needs to include the control circuit for controlling the relay drive transistor.

In view of the above problem, it is an object of the invention to provide a simple construction for enabling a secure cutoff of an electric current supply to loads in the event of a car crash.

SUMMARY OF THE INVENTION

In this invention, in the event of a car crash, the earthing means acts in response to the output from the crash sensor (e.g., air bag sensor) to bypass an electric current flowing into the input terminal of the junction box by way of the fusible link to the earth. Thereby, the fusible link is heated and fused, cutting off the flow of electric current to the respective loads. Particularly, the earthing means may comprise a relay or a transistor.

Since the earthing means may simply be constructed with a relay or a transistor, the flow of electric current to the loads in the event of the car crash can be cut off by this simple construction.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Figure 1:
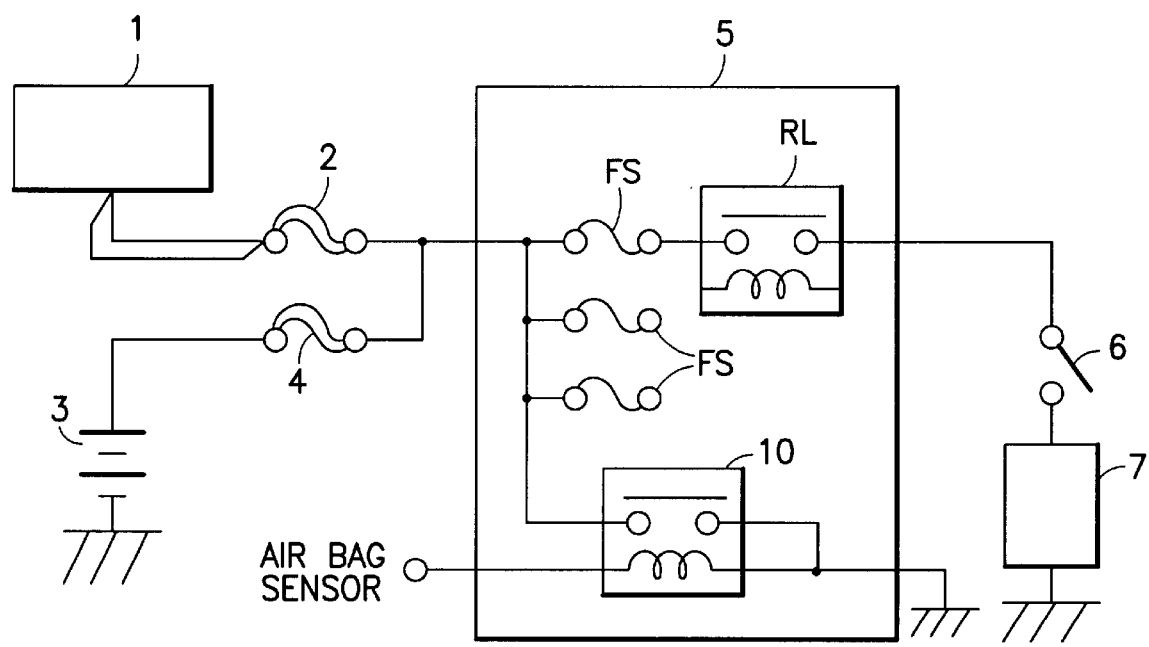
FIG. 1 is a connection diagram of one embodiment of the invention.
Figure 3:
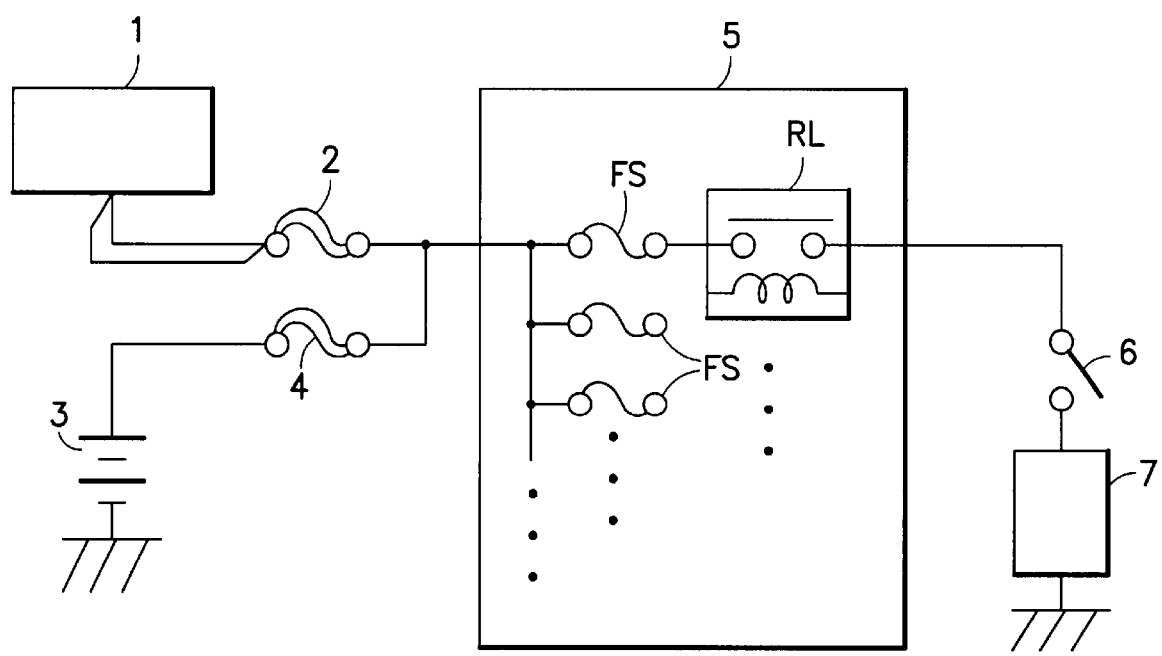
FIG. 3 is a connection diagram of the prior art.

In FIG. 1, elements identical or corresponding to those shown in FIG. 3 are identified by like reference numerals and symbols. FIG. 1 differs from FIG. 3 in the following. A relay 10 is provided as an earthing means in a junction box 5. One end of a relay coil of the relay 10 is connected with an air bag sensor (or another crash sensor already existing in the vehicle like a seat belt tightening system) and the other end thereof is grounded. One end of a normally open contact of the relay 10 is connected with an input terminal of the junction box 5 and the other end thereof is grounded.

In the construction shown in FIG. 1, in the event of a car crash, an alternator 1 stops generating power, thereby stopping the supply of electric current from the alternator to the junction box 5. The relay coil of the relay 10 is excited by an output current from the air bag sensor, thereby turning the normally open contact on. An electric current supplied from a battery 3 flows to an earth via a fusible link 4 and the relay 10, and heats and fuses the fusible link 4, thereby securely cutting off the flow of electric current to respective loads 7.

Accordingly, in the case of the car crash, the flow of electric current to the respective loads can securely be cut off by the very simple construction. In other words, the complicated construction of the prior art system is not necessary.

Figure 2:
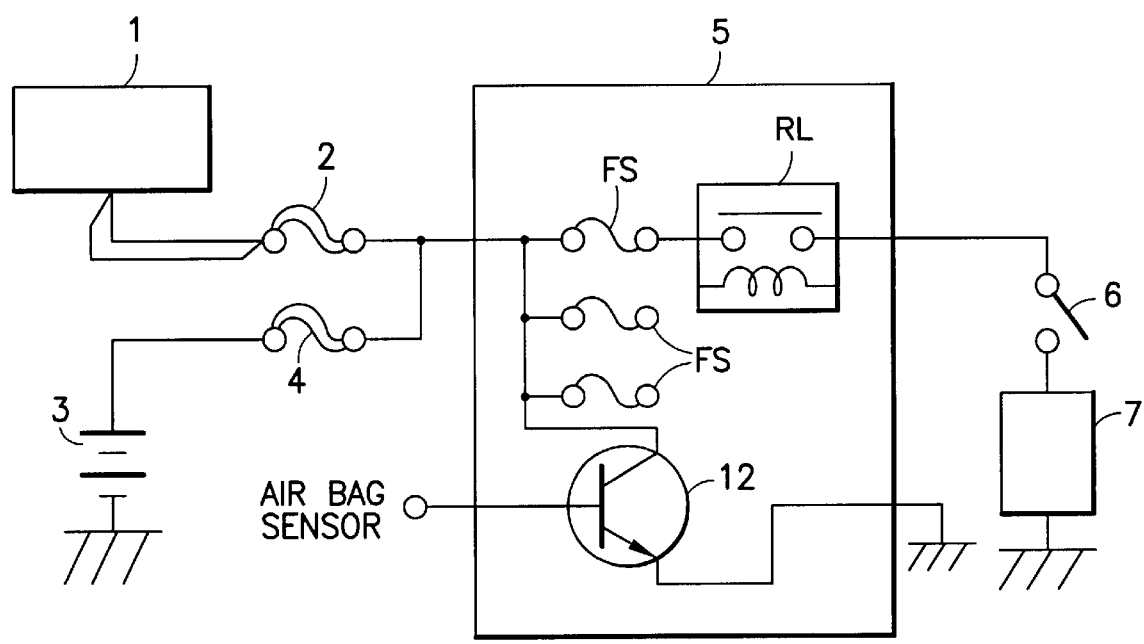
FIG. 2 is a connection diagram of another embodiment of the invention.

Another embodiment of the invention is shown in FIG. 2. In this embodiment, a PNP transistor 12 is provided in place of the relay 10 of FIG. 1, and a base of the transistor 12 is connected with an air bag sensor, a collector thereof is connected with an input terminal of a junction box 5, and an emitter thereof is grounded. In the event of a car crash, an output current from the air bag sensor turns the transistor 12 on and an electric current supplied from a battery 3 flows to an earth via a fusible link 4 and the collector and the emitter of the transistor 12, thereby heating and fusing the fusible link 4. In this manner, the flow of electric current to the respective loads can securely be cut off similar to the first embodiment shown in FIG. 1.

It shall be appreciated that an FET or an IC having a bypass function may be used as an earthing means.

LIST OF REFERENCE NUMERALS

1 . . . Alternator 2, 4 . . . Fusible Link

3 ... Battery
5 ... Junction Box
7 ... Load
10 ... Relay
12 ... PNP Transistor
FS ... Fuse
RL ... Relay

What is claimed is:

1. An electric current distribution system, particularly for powering a plurality of loads such as lamps, motors, and ignition systems in automotive vehicles, comprising:

a junction box (5) having an input terminal connected with an electric power source (1;3) for providing power to said junction box, and a plurality of output terminals electrically coupled to the input terminal and connected respectively with said loads (7) for providing power to said loads, a fusible link (4) connected between the input terminal of the junction box (5) and the power source (1;3), and earthing means (10;12) comprising a grounding element connected between the input terminal and ground and acting in response to a direct signal from a crash sensor to immediately earth the input terminal of the junction box (5) causing excess current to flow through and break the fusible link (4) cutting off power to the input terminal, the output terminals and said loads.

2. An electric current distribution system according to claim 1, further comprising a crash sensor of an airbag and a crash sensor of a seat belt tightening system and wherein one of the crash sensor of an air bag and the crash sensor of a seat belt tightening system is used as the crash sensor for producing the signal to the earthing means (10;12).

3. An electric current distribution system according to claim 1, wherein the junction box (5) further comprises a plurality of series circuits (FS, RL) connected respectively between the input terminal and the plurality of output terminals.

4. An electric current distribution system according to claim 3, wherein the series circuits each comprise a fuse (FS) and a relay (RL).

5. An electric current distribution system according to claim 1, wherein said power source comprises at least one of a battery (3) and an alternator (1).

6. An electric current distribution system according to claim 5, wherein the input terminal of the junction box (5) is connected with an alternator (1) in parallel to a battery (3), and wherein said fusible link comprises respective fusible links (2,4) connected between the alternator (1) and the battery and the input terminal of the junction box (5).

7. An electric current distribution system according to claim 1, wherein said grounding element of the earthing means comprises a relay (10) actuated by said signal from a crash sensor.

8. An electric current distribution system according to claim 7, wherein said relay comprises a coil and the crash sensor is connected with the coil of the relay (10).

9. An electric current distribution system according to claim 1, wherein said grounding element of the earthing means comprises a transistor (12) actuated by said signal from a crash sensor.

10. An electric current distribution system according to claim 9, wherein the crash sensor is connected with the base of the transistor (12).

11. Apparatus for cutting off all current flow to a set of operating loads such as lamps, motors, and the ignition system, in an automotive vehicle when the vehicle is involved in a crash, of the type comprising:

a junction box disposed on said vehicle;

a plurality of series circuits disposed in said junction box;

input terminal means, electrically coupled to a current source on said vehicle and connected in common to said plurality of series circuits, for providing current to said series circuits, and including a fusible link between said current source and said series circuits;

a plurality of output terminals respectively coupled between said plurality of series circuits and a plurality of said operating loads, for respectively providing current to said loads;

crash sensing means for sensing the crashing of the vehicle and producing a signal indicative thereof;

wherein the improvement comprises:

a grounding element, connected directly to said crash sensing means and between the input terminal means and ground, for acting in response to said indicative signal from said crash sensing means to immediately ground the input terminal means causing excess current to flow through and break the fusible link cutting off current to said series circuits, said output terminals and to said loads in the event of a crash of said vehicle.

12. Apparatus according to claim 11, wherein said series circuits each comprise a fuse and a relay.

13. Apparatus according to claim 11, wherein said current source comprises at least one of a battery and an alternator.

14. Apparatus according to claim 11, wherein said crash sensing means comprises one of a crash sensor of an airbag and a crash sensor of a seat belt tightening system.

15. Apparatus according to claim 11, wherein said grounding element comprises a relay.

16. Apparatus according to claim 15, wherein said relay comprises a coil and the crash sensor means is connected with the coil of the relay.

17. Apparatus according to claim 11, wherein said grounding element comprises a transistor.

18. Apparatus according to claim 17, wherein said crash sensor means is connected with the base of the transistor.

19. Apparatus according to claim 11, further comprising a plurality of switches respectively coupled between said plurality of output terminals and said plurality of said operating loads.

* * * * *